July 12, 1949.  E. S. GEORGE ET AL  2,476,036
DEMOUNTABLE MACHINE HANDLE
Filed Aug. 8, 1946
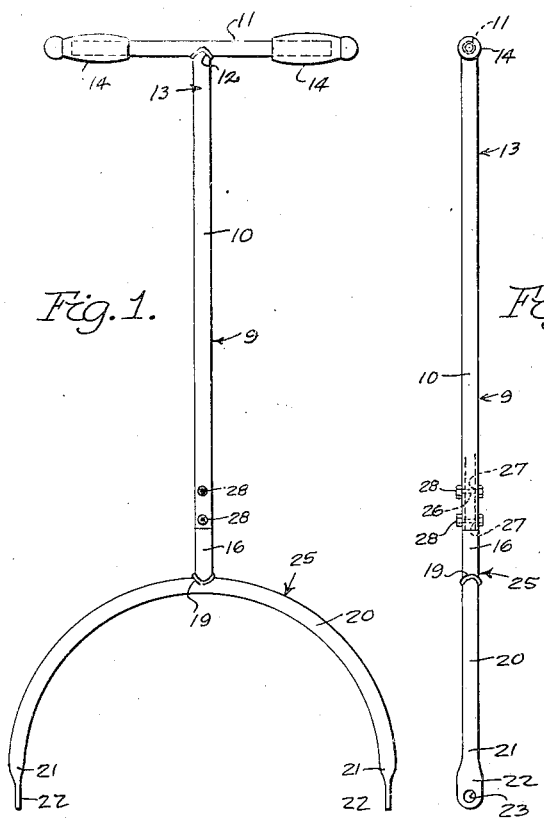
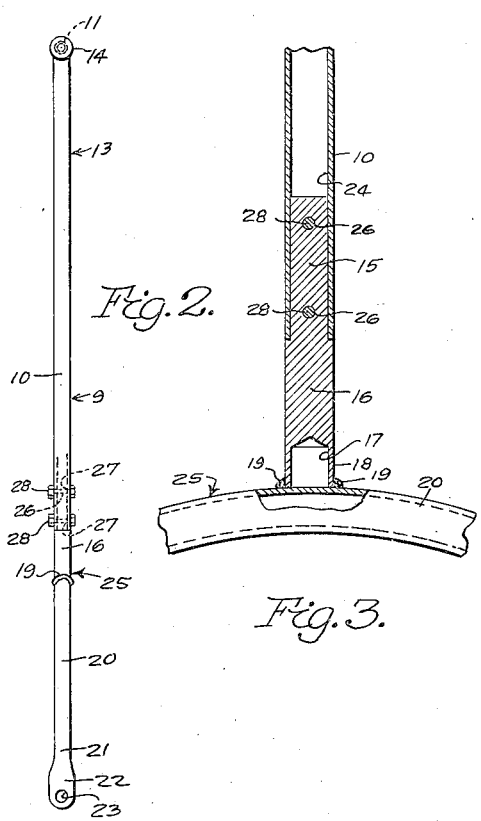
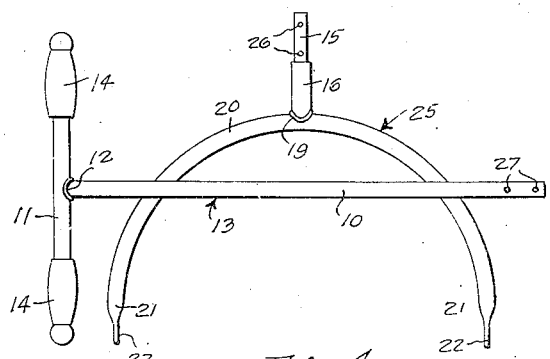
INVENTOR.
Edwin S. George
BY Harold L. Blydenburgh
Barthel + Bugbee
ATTYS Patented July 12, 1949

2,476,036

UNITED STATES PATENT OFFICE 2,476,036

DEMOUNTABLE MACHINE HANDLE

Edwin S. George, Bloomfield Hills, and Harold L. Blydenburgh, Highland Park, Mich., assignors to The Moto-Mower Company, Detroit, Mich., a corporation of Michigan Application August 8, 1946, Serial No. 689,215

1 Claim. (Cl. 56—249)

This invention relates to handles, and in particular to machine or equipment handles.

One object of this invention is to provide a machine or equipment handle which is demountable into a plurality of sections, whereby it may be packed or stored in small space or whereby the machine to which it is attached may be conveniently shipped in a small crate complete with the handle or transported without one part of the handle in the baggage compartment of an ordinary passenger automobile.

Another object is to provide a demountable machine or equipment handle having a yoke portion for attachment to the machine or equipment, such as a lawnmower, roller, sweeper or the like and a removable shaft portion carrying a cross bar with hand grips thereon for the purposes set forth in the preceding object.

Another object is to provide a demountable machine or equipment handle, as set forth in the preceding objects, wherein the yoke portion carries a connection member telescoping or mating with a correspondingly recessed shaft portion, with suitable fasteners for detachably holding these parts together.

Other objects and advantages of the invention will become apparent during the course of the following description of the accompanying drawings, wherein:

Figure 1 is a front elevation of a demountable machine or equipment handle according to a preferred form of the present invention;

Figure 2 is a right-hand side elevation of the handle shown in Figure 1;

Figure 3 is an enlarged front elevation, partly in longitudinal section, of the connection between the yoke portion and the shaft portion of the handle, showing certain details thereof; and Figure 4 is a front elevation of the handle shown in Figures 1 and 2 in its demounted condition ready for packing, transportation or storage.

Certain machines or equipment, such as lawnmowers, rollers, sweepers and similar devices are customarily provided with handles for guiding or propelling them. These handles are ordinarily provided with a shaft having at one end a yoke-shaped portion consisting of diverging arms adapted to be connected to the machine or equipment. The upper end of the shaft is ordinarily provided with a cross bar with or without hand grips at the opposite ends thereof for the grasp of the operator.

Hitherto, the handles thus provided have been made in a single unit. Such unitary handles are of considerable length in comparison with the dimensions of the machine to which they are to be attached and hence it is often necessary to crate and ship the handle apart from the machine to which it is to be attached. Such shipment in separate crates often results in the arrival of the machine ahead of the handle, or vice versa, or in the temporary loss of the handle in shipment, giving rise to frequent complaints from dealers and customers. When the handle is shipped in the same crate with the machine, however, the crate is unnecessarily bulky, resulting in seriously increased shipping charges as well as in the unduly increased cost of the crate and its handling. Furthermore, a machine with a conventional unitary handle is an unwieldy article when it is desired to transport the machine or to store it for an extended period of time. It is ordinarily difficult and inconvenient to remove the handle, and the handle is not necessary when it is desired to transport the machine to a repair shop for repairs or for sharpening of the cutting blades or cutting reel. Since the machine cannot be placed conveniently in the baggage compartment of an ordinary passenger automobile or in the passenger compartment thereof, such transportation is inconvenient and often impossible without the use of a truck. The ordinary user, however, does not usually have access to a truck.

The present invention provides a machine or equipment handle which eliminates all these difficulties by making the handle demountable so that the shaft and cross bar portion is readily detached from the yoke portion, enabling the latter to be retained in position connected to the machine or equipment. The shaft and cross bar unit is of a sufficiently short length to be packed in the same crate with the machine or equipment carrying the yoke portion, and the latter unit may be transported with or without the shaft and cross bar unit, in the baggage compartment of an ordinary passenger automobile.

Referring to the drawings in detail, Figure 1 shows a demountable machine or equipment handle, generally designated 9 as consisting of a tubular shaft portion 10 having a preferably tubular cross-bar 11 secured at 12, as by welding, to the shaft portion 10 and forming an upper handle unit, generally designated 13. Mounted on the outer ends of the cross bar 11 and secured thereto in any suitable manner, as by cementing, are hand grips 14 of rubber or other suitable material.

The lower end of the shaft portion 10 is arranged to fit over and mate with the reduced diameter portion 15 of a stem 16 having its lower end drilled as at 17 to provide a tubular end portion 18. The latter is secured at 19, as by welding, to a tubular yoke portion 20 of preferably arcuate form and having its ends 21 flattened to provide ears 22 with holes 23 therein for connection to the machine or equipment. The tubular end 18 is formed in the stem 16 in order to facilitate welding and to effect an even heat distribution between the stem 16 and the tubular yoke portion 20 during such welding. The reduced diameter portion 15 of the stem 16 is of such a diameter as to fit into the interior 24 of the tubular shaft portion 10. The yoke portion 20 and stem 16 together form a lower handle unit, generally designated 25.

The stem 16 and shaft portion 10 are provided with aligned holes 26 and 27 for the reception of fasteners 28, such as bolts, whereby the parts may be firmly held together yet instantly separated, and demounted when desired. The stem 16 is preferably of an outer diameter corresponding to the outer diameter of the tubular shaft portion 10 so that a smooth transition occurs therebetween, the annular shoulder 29 engaging the lower end of the shaft 10 without an external ridge or shoulder (Figure 3). From Figure 4 it will be seen that the overall length of the tubular shaft portion 10, cross bar 11 and hand grips 14 is only slightly greater than the span of the yoke portion 20 between its ends 22, so that both the upper and lower handle units 13 and 25 may be packed in a crate having the length of but one of them and also containing the machine, such as a lawnmower, rotor, sweeper or the like to which the handle is to be applied.

In the use of the handle 9, the opposite ends 21 of the yoke portion 20 are spread apart to spring the holes 23 in the ears 22 over oppositely projecting pins (not shown) in the machine or equipment. The machine or equipment, with the lower handle unit 25 thus mounted thereon, may be packed in a crate which is very little, if at all, larger than the crate ordinarily employed to ship the machine or equipment by itself. The upper handle unit 13 may then be packed in the same crate with the machine or equipment carrying the lower handle unit 25, such as in the position shown in Figure 4.

When the assembly arrives at its destination and is uncrated, the upper handle unit 13 is slipped upon the reduced diameter portion 15 of the stem 16 and the holes 26 and 27 aligned with one another, whereupon the fasteners 28 may be inserted and tightened to assemble the upper and lower handle units 13 and 25 into the demountable handle 9, which then assumes the appearance shown in Figure 1.

If the user subsequently desires to transport the machine in the baggage compartment of an ordinary passenger automobile, he merely removes the fasteners 28 and separates the upper and lower handle units 13 and 25. The machine or equipment, with the lower handle unit 25 left in position thereon, may then be loaded into the baggage compartment, with or without the upper handle unit 13, as the circumstances require. If the machine or equipment is merely to be repaired or sharpened, the upper handle unit 13 may be left behind. The lower handle unit 25 also serves as a convenient means of lifting the machine or equipment, when thus transported, and in this respect the yoke portion 20 serves as a handle or bail.

While we have shown and described our invention in detail, it is to be understood that the same is to be limited only by the appended claim, for many changes may be made without departing from the spirit and scope of our invention.

What we claim is:

A handle for use with a lawn mower comprising a tubular yoke-shaped member having a stem portion secured thereto and projecting transversely outward therefrom intermediate the ends thereof in the opposite direction from said ends, a tubular shaft having a cross member with hand grips thereon, said shaft terminating short of said yoke-shaped member, said stem portion entering and releasably engaging the end portion of said tubular shaft in overlapping relationship, and a clamping device releasably securing said shaft to said stem portion, the overall length of said tubular shaft, cross member and hand grips being only slightly greater than the span of said yoke-shaped member whereby when the handle is disassembled, it may be readily packed in the same container as the mower.

EDWIN S. GEORGE.
HAROLD L. BLYDENBURGH.

REFERENCES CITED

The following references are of record in the file of this patent:

UNITED STATES PATENTS

| Number | Name | Date |
|---|---|---|
| 271,471 | Johnston | Jan. 30, 1883 |
| 273,469 | Coldwell et al. | Mar. 6, 1883 |
| 1,850,326 | Kelly | Mar. 22, 1932 |
| 2,252,126 | Kersey | Aug. 12, 1941 |